UNITED STATES PATENT OFFICE.

ALBRECHT SCHMIDT, OF HÖCHST-ON-THE-MAIN, KARL THIESS, OF SINDLINGEN, NEAR HÖCHST-ON-THE-MAIN, AND ERNST BRYK, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

VAT DYESTUFFS AND PROCESS OF MAKING SAME.

1,128,368.     Specification of Letters Patent.     Patented Feb. 16, 1915.

No Drawing.     Application filed March 13, 1913. Serial No. 754,141.

*To all whom it may concern:*

Be it known that we, ALBRECHT SCHMIDT, Ph. D., KARL THIESS, Ph. D., and ERNST BRYK, Ph. D., citizens of the Empires of Germany and Austria-Hungary, respectively, residing at Höchst-on-the-Main, Sindlingen, near Höchst-on-the-Main, and Höchst-on-the-Main, Germany, respectively, have invented certain new and useful Improvements in Vat Dyestuffs and Processes of Making Same, of which the following is a specification.

We have found that new vat-dyestuffs can be obtained by treating the halogen-arylamino-quinones,—derived from halogen-quinones or their substitution-products on the one hand, and from arylamins and their substitution-products on the other hand,—with compounds capable of splitting off hydrogen sulfid, for instance with metallic sulfids, such as sodium sulfid, potassium sulfid, ammonium sulfid, etc., or with metallic sulfhydrates, or with salts of the thiocarbonic acids, such as xanthogenates, etc., or substances of similar action; the operation being carried out with or without the addition of sulfur and with or without using a diluent. The new vat dyestuffs thus obtained contain organically-bound sulfur, as the above treatment causes the chlorin contained in the quinone nucleus to be eliminated and to be replaced by organic sulfur.

The new dyestuffs are insoluble in most of the organic solvents, but soluble in much hot nitrobenzene with a brown to reddish-brown color, and in concentrated sulfuric acid with a red to reddish-blue to blue color. They yield, particularly on animal fiber, very rich and fast tints, varying from yellowish-brown to brown, brownish-red and red. In preparing these dyestuffs it is advantageous to use alcohol as a diluent, but other diluents may also be used, for instance water.

The following examples illustrate our invention:

Example I: 80 parts of the condensation product derived from chloranil and anilin having the formula $$O=C_6Cl_2(NH.C_6H_5)_2=O$$

(see *Beilstein*, Vol. III, page 343) are boiled for about 20 hours with 45 parts of commercial calcined sodium sulfid in 450 parts of alcohol until a test dissolved in concentrated sulfuric acid no longer gives a violet-blue but a red solution. After cooling, the solution is filtered, boiled with water and dried. The dyestuff, which is obtained with a very good yield, dyes from the vat, giving unlike the starting material, fast dyeings, very rich, deep-brown tints of great fastness, particularly on animal fiber. The dyestuff, which forms a brown powder, is insoluble in most of the organic solvents; it dissolves, however, in much hot nitrobenzene, with a brown color. If, in place of the condensation-product from chloranil and anilin, that from chloranil and β-naphthylamin having the formula $$O=C_6Cl_2(NH.C_{10}H_7)_2=O$$

(see Swiss Patent No. 56,148) is substituted, a product is obtained which dyes wool, in the vat, reddish-brown tints, while for instance by using the condensation-product of o-anisidin and chloranil, a product is obtained which dyes brownish-red tints.

Example II: 20 parts of the condensation-product from chloranil and anilin are boiled for several hours with 15 parts of potassium sulfhydrate in about 200 parts of alcohol, until the product of the reaction no longer dissolves in concentrated sulfuric acid to a violet-blue, but to a red solution. The dyestuff thus obtained is identical with the product obtained according to Example I, dyeing wool brown tints. If the reaction is protracted, the same result is obtained even by operating at ordinary temperature for instance at 15–20° C.

Example III: 20 parts of the condensation-product from chloranil and anilin are heated to boiling for 10 hours with 30 parts of potassium xanthogenate and 2 parts of sodium acetate in 200 parts of alcohol. After cooling, the solution is filtered, the dyestuff boiled with water, filtered and dried. The coloring matter thus obtained very much resembles, as regards its properties, the brown vat-dyestuff produced according to Example I.

Having now described our invention, what we claim is:

1. The process of manufacturing new vat-dyestuffs containing sulfur, which consists in treating the halogen-arylamin-quinones derived from halogen-quinones and arylamins with substances capable of splitting off hydrogen sulfid.

2. The process of manufacturing new vat-dyestuffs containing sulfur, which consists in treating the halogen-arylamin-quinones derived from halogen-quinones and arylamins with substances capable of splitting off hydrogen sulfid, in the presence of a diluent.

3. As new products, the hereinbefore-described new vat-dyestuffs containing organically-bound sulfur, obtainable by treating a halogen-arylamin-quinone derived from a halogen-quinone and an arylamin with substances capable of splitting off hydrogen sulfid, said dyestuffs being insoluble in most of the organic solvents, soluble in much hot nitrobenzene with a brown to reddish-brown color, in concentrated sulfuric acid with a red to reddish-blue to blue color, and dyeing animal fiber, in the vat, tints, varying from yellowish-brown to brown, reddish-brown and reddish, of great fastness and intensity.

4. As a new product, the hereinbefore-described new vat-dyestuff, being practically free from halogens and containing organically-bound sulfur, produced by treating the product obtainable by condensing chloranil and anilin with an alkali sulfid, said dyestuff being a brown powder, insoluble in most of the organic solvents, soluble in much hot nitrobenzene with a brown color, in concentrated sulfuric acid with a red color, and dyeing animal fiber, in the vat, deep brown tints of great fastness and intensity.

In testimony whereof, we affix our signatures in presence of two witnesses.

ALBRECHT SCHMIDT.
KARL THIESS.
ERNST BRYK.

Witnesses:
  JEAN GRUND,
  CARL GRUND.